(12) United States Patent
Goyet et al.

(10) Patent No.: US 8,321,504 B2
(45) Date of Patent: Nov. 27, 2012

(54) METHOD AND SYSTEM FOR SUBSCRIBER BASE MONITORING IN IP DATA NETWORKS

(76) Inventors: Jean-Philippe Goyet, Montreal (CA); Nicolas Carre, Montreal (CA); Eric Melin, Montreal (CA)

( * ) Notice: Subject to any disclaimer, the term of this patent is extended or adjusted under 35 U.S.C. 154(b) by 0 days.

(21) Appl. No.: 13/144,226

(22) PCT Filed: Jan. 14, 2010

(86) PCT No.: PCT/CA2010/000040
§ 371 (c)(1),
(2), (4) Date: Jul. 12, 2011

(87) PCT Pub. No.: WO2010/081222
PCT Pub. Date: Jul. 22, 2010

(65) Prior Publication Data
US 2011/0265109 A1 Oct. 27, 2011

Related U.S. Application Data (60) Provisional application No. 61/145,336, filed on Jan. 16, 2009.

(51) Int. Cl.
*G06F 15/16* (2006.01)
(52) U.S. Cl. ....................................................... 709/203
(58) Field of Classification Search .................... 709/203
See application file for complete search history.

(56) References Cited

U.S. PATENT DOCUMENTS

| | | | |
|---|---|---|---|
| 5,787,253 A | 7/1998 | McCreery et al. | |
| 6,076,093 A | 6/2000 | Pickering | |
| 6,400,812 B1 * | 6/2002 | Svedberg et al. | 379/114.14 |
| 6,606,644 B1 | 8/2003 | Ford et al. | |
| 7,222,192 B2 * | 5/2007 | Allison et al. | 709/245 |
| 7,334,038 B1 * | 2/2008 | Crow et al. | 709/227 |
| 7,337,221 B2 * | 2/2008 | Radi et al. | 709/223 |
| 7,558,234 B2 * | 7/2009 | Dommaraju et al. | 370/328 |
| 7,808,994 B1 * | 10/2010 | Vinokour et al. | 370/392 |
| 2006/0040711 A1 | 2/2006 | Whistler | |
| 2006/0155866 A1 | 7/2006 | Wei | |
| 2006/0262736 A1 * | 11/2006 | Dong et al. | 370/254 |
| 2007/0112800 A1 | 5/2007 | Seidl et al. | |

(Continued)

FOREIGN PATENT DOCUMENTS
CN 1642115 7/2005
(Continued)

OTHER PUBLICATIONS

Lucent Technologies, "Proposal for enhancements for the monitor and control of IP sessions", 3rd Generation Partnership Project (3GPP) Draft S1-022252, TSG-SA WG 1 (Services) #18, Nov. 14-18, 2002, Bussan, Korea.

*Primary Examiner* — Imad Hussain (57) ABSTRACT

The present method and system relate to monitoring a subscriber base in an IP data network. The method and system receive at a subscriber base system information extracted from collected data of IP data sessions. The extracted information comprises at least a unique identifier and a timestamp. The subscriber base system queries a subscriber database with the extracted information to correlate with a corresponding subscriber record. If the extracted information is correlated to the corresponding subscriber record, the extracted information is used to update the subscriber database. If the extracted information cannot be correlated to an existing subscriber record, the extracted information is used to create a new subscriber record in the subscriber database.

14 Claims, 4 Drawing Sheets

U.S. PATENT DOCUMENTS

| | | | |
|---|---|---|---|
| 2007/0118616 A1* | 5/2007 | Simongini et al. | 709/219 |
| 2008/0065759 A1* | 3/2008 | Gassewitz et al. | 709/224 |
| 2008/0155613 A1* | 6/2008 | Benya et al. | 725/89 |
| 2008/0281695 A1 | 11/2008 | Whitehead | |
| 2009/0193433 A1* | 7/2009 | Maes | 719/315 |
| 2009/0293113 A1* | 11/2009 | Foti | 726/12 |
| 2010/0241544 A1* | 9/2010 | Benson et al. | 705/34 |
| 2011/0072133 A1* | 3/2011 | Sullivan et al. | 709/224 |
| 2011/0077005 A1* | 3/2011 | Bhatt et al. | 455/435.1 |

FOREIGN PATENT DOCUMENTS

| | | |
|---|---|---|
| CN | 101193044 | 6/2008 |
| WO | 92/19054 | 10/1992 |
| WO | 2008/124947 | 10/2008 |

\* cited by examiner

METHOD AND SYSTEM FOR SUBSCRIBER BASE MONITORING IN IP DATA NETWORKS

FIELD

The present method and system generally relate to monitoring of evolution of a subscriber base in Internet Protocol (IP) data networks. More specifically, the method and system analyze the IP traffic of a data network, in order to update in real time a database of subscribers. During an IP based data session, each subscriber is associated with at least one constant and unique identifier. This identifier is extracted from the IP traffic and used to detect new subscribers, and recognize existing subscribers. In addition to the notions of new and existing (unchanged) subscribers, the notions of inactive and upgraded (using a new device) subscribers are introduced, via the real time monitoring of the IP data traffic. The present invention can be applied to an IP based mobile data network, as well as to an IP based fixed broadband network.

BACKGROUND

Mobile Operators or Internet Service Providers (ISPs) usually rely on their information system to keep track of their subscriber base. For this purpose, a centralized database is updated each time a new subscriber registers with the Operator, or permanently leaves the Operator.

The main drawback with this traditional method is that it is static, and it does not differentiate between registered subscribers and active subscribers. For instance, there can be a substantial delay between the moment a new subscriber registers with the Mobile Operator or ISP, and the moment when he effectively starts using the data service. Also, a subscriber may still be registered in the Operator database, but may have been inactive for a significant time on the IP data network. Thus, this subscriber could potentially be removed from an active subscriber base.

This notion of dynamic versus static subscriber base becomes increasingly important for Mobile Operators and ISPs, since they have an increasing need for an accurate and real time view of their subscriber base. For instance, more and more revenue is generated via value added content distributed over the IP data networks. The subscribers pay premium fees to access this value added content. Thus, it is critical for the Operators to precisely monitor the audience of these services in almost real time. This implies not only measuring the total number of subscribers currently consuming the value added service, but also knowing precisely the total number of subscribers in the subscriber base. Then, an accurate relative audience can be computed: the percentage of subscribers from the subscriber base attending this specific service (not an approximation of the subscriber base but its exact value at the precise time when the measure is performed).

Therefore, there is a need for overcoming the issues discussed above, concerning the limitations of a traditional information system to track in real time the evolution of the subscriber base of a Mobile Operator or ISP. Accordingly, a method and system for subscriber base monitoring in IP data networks are sought.

An object of the present method and system is therefore to provide subscriber base monitoring in IP data networks.

The foregoing and other objects, advantages and features of the present method and system will become more apparent upon reading of the following non-restrictive description of any illustrative embodiments thereof, given by way of example only with reference to the accompanying drawings.

DETAILED DESCRIPTION

Generally stated, a non-restrictive illustrative embodiment of the method and system performs subscriber base monitoring in IP data networks. It relies on a unique identifier per subscriber, to identify already known subscriber records as well as new subscriber records, engaged in a data session. The new subscriber records are added to a subscriber database, with the precise time at which they were discovered. The already known subscriber records are referred to as unchanged subscribers and are already present in the subscriber database.

Also, the notion of labeling subscriber records is introduced. The labeling of subscriber records is updated based on extracted information from ongoing IP sessions. For example, subscriber records which have not been engaged in data sessions for a pre-defined amount of time are allocated a label inactive. Optionally, a subscriber record which has been allocated a label inactive for an additional pre-defined amount of time can be deleted from the subscriber database.

Additionally, the notion of upgraded subscriber record is introduced. It refers to an unchanged subscriber record for which a new terminal is being used. The use of the new terminal is detected by analyzing the extracted information from the IP data session. It is particularly relevant to the case of a mobile data network, when a new mobile device is used for a known subscriber record. It can also be applied to a fixed broadband network, in which a terminal model is associated with the subscriber record.

The allocated label to the subscriber record is modified from unchanged (optionally from new) to upgraded in the subscriber database, with the precise time at which the new terminal was detected with an identifier for this new terminal.

A monitoring probe is used to collect the traffic of the IP data network and transmit the captured data traffic to a filtering system. The filtering system extracts the relevant information: unique identifier of the subscriber record engaged in a data session, identifier of the terminal being used by the subscriber, etc. The filtering system relies on technology well known in the art, such as for example Deep Packet Inspection (DPI), to extract the relevant information from the IP data traffic. Since a filtering system based on DPI operates in real time on the captured data traffic, the subscriber database is upgraded with real time extracted information.

A subscriber base system, which comprises the subscriber database, can be used by an Operator for generating valuable reports for marketing purposes, when combined for example with a business intelligence analytic system. For instance, accurate real time audience measurements can be performed to assess the audience of value added services or advertising sequences. Also, the subscriber base system can be used to segment the subscriber records in different categories based on their allocated labels (new, unchanged, upgraded, and inactive), to perform analytic studies of corresponding subscribers' behaviors and consumption of data services, segmented along these categories.

Figure 1:
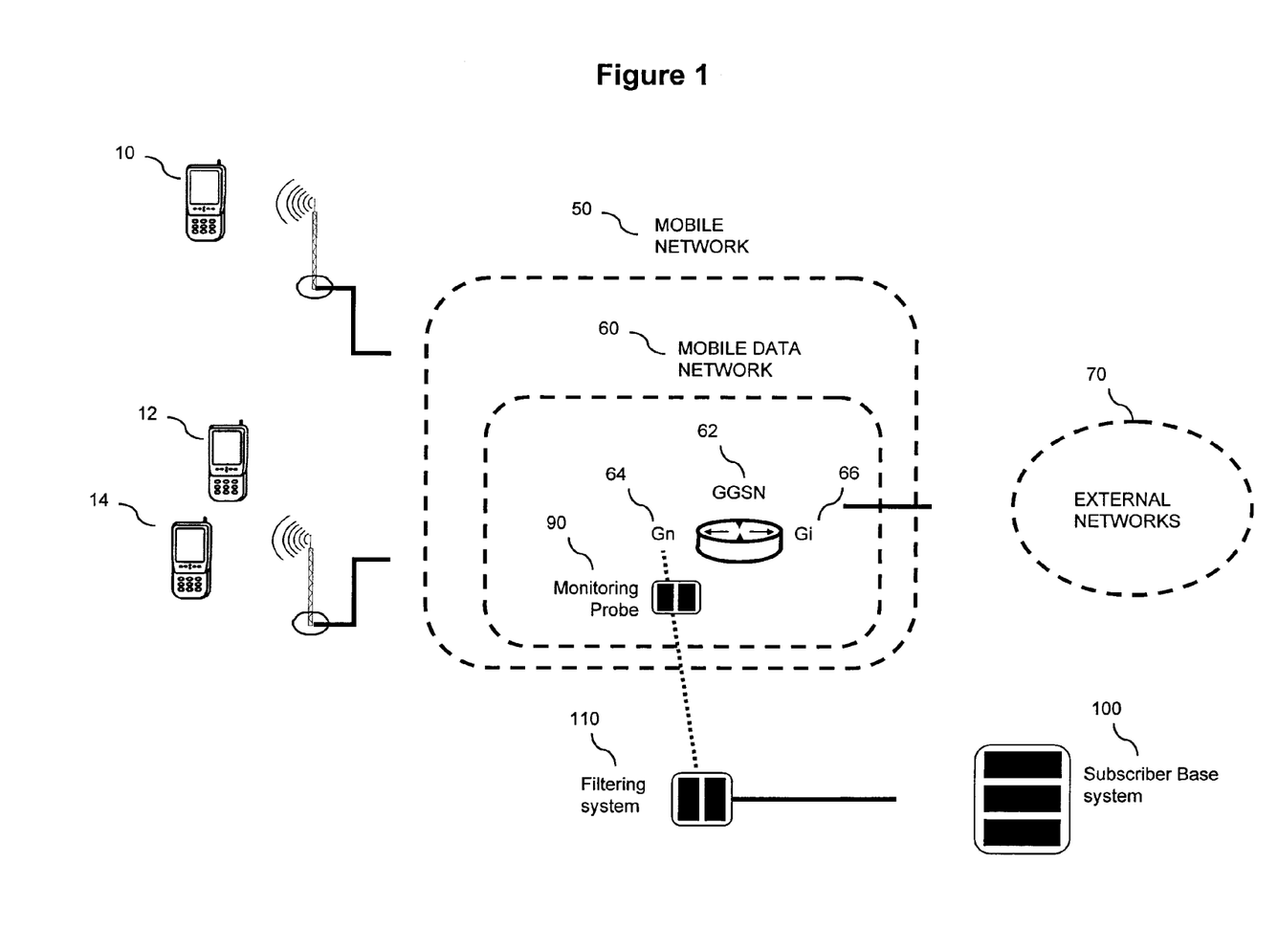
FIG. 1 illustrates a system for subscriber base monitoring in IP data networks, in the context of a Mobile Operator, according to a non-restrictive illustrative embodiment.
Figure 2:
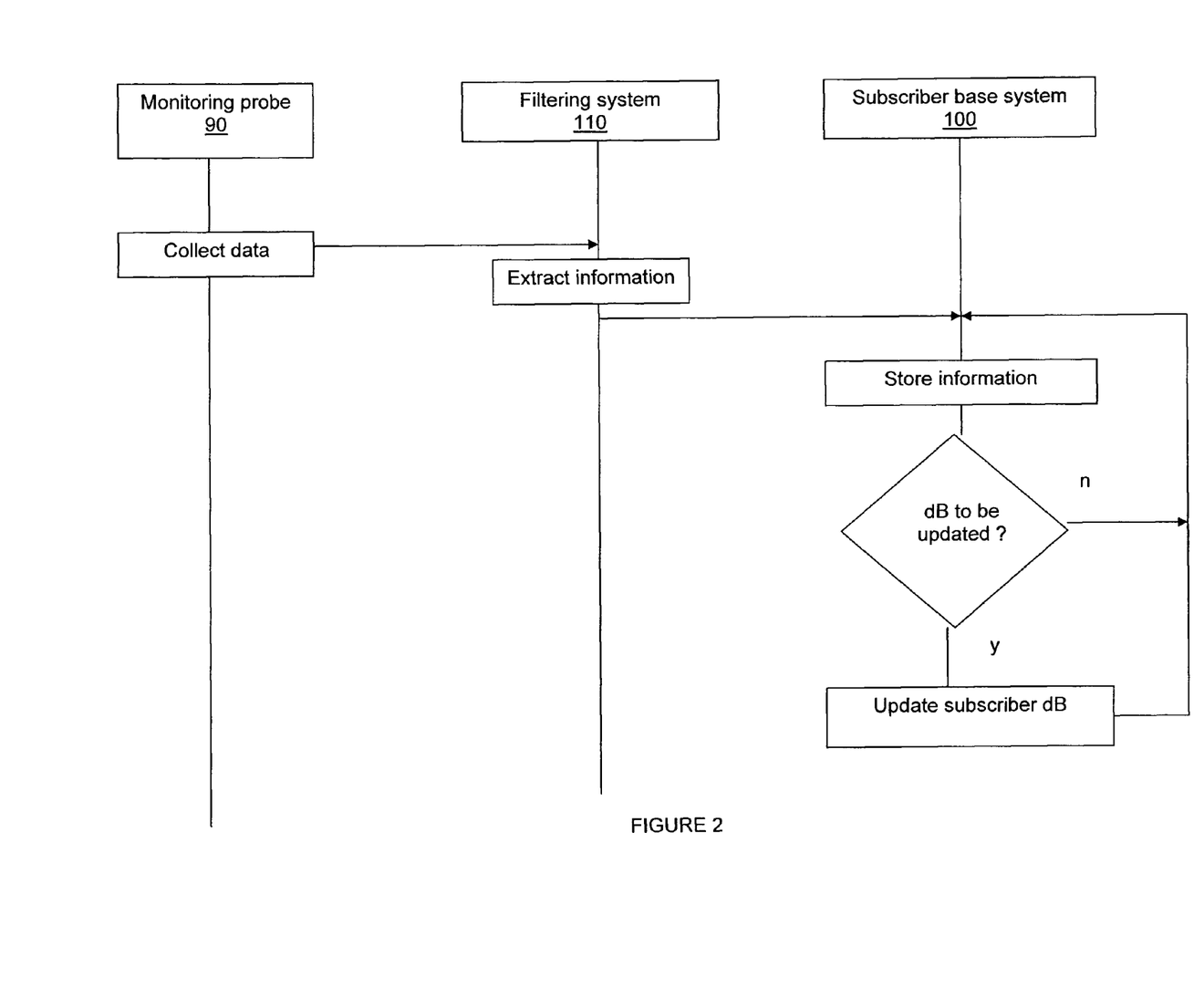
FIG. 2 illustrates a method for subscriber base monitoring in IP data networks, according to a non-restrictive illustrative embodiment.

Referring now concurrently to FIGS. 1 and 2, a method and system for subscriber base monitoring in IP data networks, in the context of a Mobile Operator, is depicted.

A mobile network 50 is represented in FIG. 1. The mobile network 50 includes a mobile data network 60, which is a specific infrastructure of the mobile network 50 dedicated to the transport of IP based data traffic. The mobile data network 60 is an interface between mobile devices 10, 12 and 14 engaged in data sessions, with external networks 70. Any IP based data session in which a mobile device 10, 12, 14 is engaged, goes through the mobile data network 60. The external networks 70 can be of different types: Internet, an ISP network, and also the services and applications network of an Operator (for example an IP Multimedia Subsystem (IMS) of the Operator).

The present invention can be applied to any type of mobile network: General Packet Radio Service (GPRS), Universal Mobile Telecommunication System (UMTS) network, Code Division Multiple Access (CDMA) network, or Worldwide Interoperability for Microwave Access (WIMAX) network. As illustrated in FIG. 1, the present system and method are described in the context of a General Packet Radio Service (GPRS) or Universal Mobile Telecommunication System (UMTS) network, for exemplary purposes, but are not limited to such networks.

A Gateway GPRS Support Node (GGSN) 62 is key for the transport of the IP data traffic in a GPRS or UMTS mobile data network 60. The GGSN 62 is connected through a Gi interface 66 to the external networks 70. It is connected through a Gn interface 64 to the rest of the GPRS or UMTS packet switched core network. The packet switched core network is the mobile data network 60 for a GPRS or UMTS network. The packet switched core network is connected to the Radio Access Network (not represented on FIG. 1). The Radio Access Network lies between the mobile devices 10, 12 and 14, and the packet switched core network 60.

A monitoring probe 90 collects in real time the IP data traffic in the mobile data network 60 and transmits the collected IP data traffic to a filtering system 110. The filtering system extracts information in real time from the captured IP data traffic. The filleting system relies on a DPI engine to analyze the different IP protocol layers (mainly network, transport, session and application), and extract various types of parameters and information. The DPI engine is a technology well known in the art. Its usual purpose in the context of a mobile network is to analyze and classify the IP traffic transported over the data network 60 (web, instant messaging, mail, audio, video streaming . . . ).

Though represented as two separate entities on FIG. 1, the monitoring probe 90 and the filtering system 110 may be integrated in a single equipment.

As represented in FIG. 1, the monitoring probe 90 uses the Gn interface 64 of the GGSN 62 as the point of capture for the IP data traffic. Alternatively, the Gi interface 66 of the GGSN 62 can also be used for this purpose.

In order to update a subscriber base system 100 in real time, the filtering system 110 analyses the data sessions in which the mobile devices are engaged. As already explained, this task is performed by the DPI engine of the filtering system 110, by extracting information from the IP data traffic captured by the monitoring probe 90 from the Gn interface 64. For each data session, a unique identifier associated to the subscriber record of the subscriber base system 100 is extracted.

In the context of the GPRS or UMTS network, the unique identifier representing the mobile devices is the International Mobile Subscriber Identity (IMSI). The IP data sessions on the Gn interface 64 are encapsulated in a dedicated IP tunneling protocol: the GPRS Tunneling Protocol (GTP). The GTP protocol has a control plane to manage the data sessions. The IMSI is used by the GTP control plane, at the establishment of each data session, to identify a corresponding subscriber record. This procedure is well known in the art as the Packet Data Protocol (PDP) context creation.

Thus, by analyzing the GTP control plane, the filtering system 110 has the capability to record amongst other things the IMSI of the mobile devices engaged in a data session, with a timestamp corresponding to the PDP context creation. These records constitute the information extracted from the data collected by the monitoring probe 90 and transmitted continuously or on a regular basis to the subscriber base system 100 for further analysis.

Alternatively, the filtering system 110 could analyze the IP data traffic on the Gi interface 66 of the GGSN 62, extracting the same type of information from the data collected via the monitoring probe 90 on the Gi interface 66. The availability, on the Gi interface, of a unique identifier for the mobile devices engaged in data sessions is dependent on the infrastructure deployed. For instance, if a Remote Authentication Dial In User Service (RADIUS) protocol is used for authentication/authorization/accounting purposes, a unique identifier is employed by the RADIUS signaling protocol to identify the mobile devices engaged in the data session. The IMSI may be used for this purpose in this case too, but since it is an optional parameter of the RADIUS signaling protocol, it may not be present. Alternatively, a Mobile Subscriber ISDN (MSISDN), which is a mandatory parameter of the RADIUS signaling protocol, can be used instead. The MSISDN represents a phone number of the mobile devices 10, 12, 14 and is directly related to the corresponding subscriber records.

Figure 3:
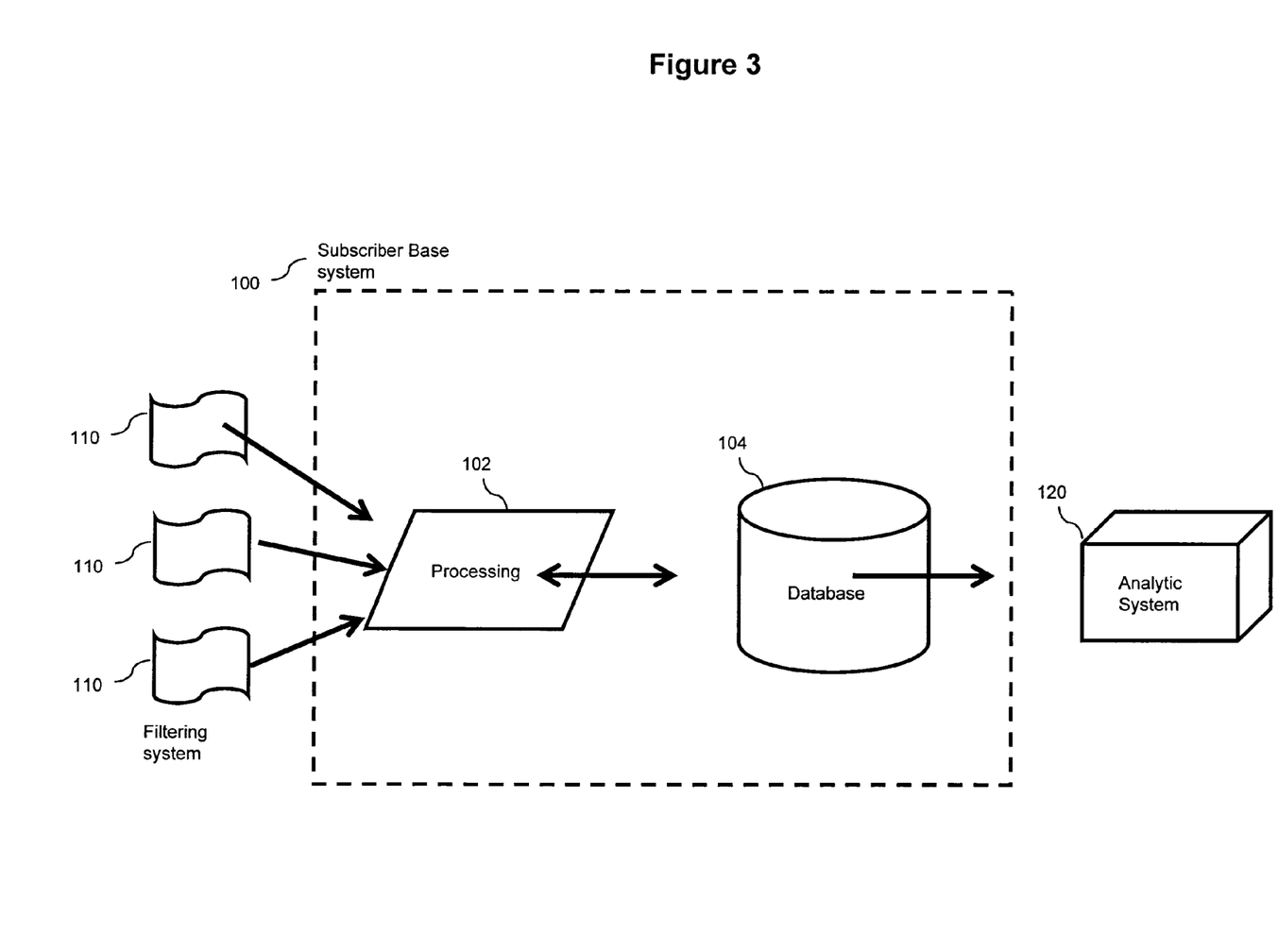
FIG. 3 illustrates system architecture of the subscriber base monitoring system, according to a non-restrictive illustrative embodiment.

Reference is now concurrently made to FIG. 3, which is a schematic representation of the subscriber base system 100. The subscriber base system 100 is composed of a processing unit 102 and a database 104. Upon receipt of the information from the filtering system 110, the subscriber base system 100 performs appropriate processing to update the subscriber database 104. The processing unit 102 performs computation of the information received from the filtering system 110, correlates with a subscriber record from the subscriber database 104, and updates the subscriber database 104 when appropriate.

Specifically, for all information transmitted by the filtering system 110, the processing unit 102 queries the subscriber database 104 to correlate the information with the unique identifier of one of the stored subscriber records. If the unique identifier of the received information is already present in the subscriber database 104, the timestamp present in the transmitted information is used to update the corresponding subscriber record in the subscriber database 104 with the last time the corresponding mobile device has been active (referred to as the activity timestamp stored in the database for the subscriber record corresponding to the unique identifier). A label associated to each subscriber record is also stored in the subscriber database 104 and modified based on information extracted from ongoing IP data sessions and time delays (as explained in the following paragraphs).

If the unique identifier is not present in the subscriber database 104, a new entry is created in the subscriber database 104 for this new unique identifier. The timestamp present in the transmitted information is stored in the database (the creation timestamp), along with the unique identifier of the new subscriber record, to indicate the date of creation of this new subscriber record. This subscriber record is labeled as a new.

An arbitrary novelty delay is specified, during which a subscriber record remains labeled as new. Upon expiration of this novelty delay, the subscriber record is allocated the label unchanged. The subscriber database 104 may be regularly checked (every hour, or day, or week—based on the Mobile Operator needs) to detect subscriber records labeled as new for which the novelty delay has expired (the difference between the current time and the creation timestamp exceeds the novelty delay). The novelty delay can be fixed to a few days, weeks or even months; depending on how the subscriber base system 100 is used by a business intelligence analytic system 120 of the Mobile Operator. Different novelty delays could also be defined and applied, depending on different contexts of the marketing analysis to be performed.

An arbitrary inactivity delay is specified. The subscriber database 104 may be regularly checked (every hour, or day, or week) to detect subscriber records not having been involved for a specific time in any IP based data session: i.e. the subscriber records for which the difference between the current time and the last activity timestamp is greater than the inactivity delay. These subscriber records are labeled as inactive. This mechanism applies to both unchanged and new subscribers. Following this transition, if information transmitted by the filtering system 110 indicates activity in an IP data session for one of the inactive subscriber records, the label of the corresponding subscriber record is transitioned back to unchanged or new subscriber, based on its prior label.

Optionally, an arbitrary suppression delay can be specified. The subscriber database 104 may be regularly checked (every hour, or day, or week) to detect inactive subscriber records to be deleted, i.e. subscriber records for which the difference between the current time and the time at which they became inactive is greater than the suppression delay (for this purpose, an inactive timestamp is generated once a subscriber record is labeled as inactive and stored in the subscriber database 104). These subscriber records may be permanently deleted from the subscriber database 104. The rationale is that these subscriber records have been inactive for such a long time that taking them into account in the subscriber database 104 would alter its accuracy. If such a deleted subscriber record becomes active again, the subscriber record will re-integrate the subscriber database 104, labeled as new. The selection of the value of the suppression delay is delicate, to maintain a coherent subscriber database 104. In particular, it should be avoided to have large numbers of subscriber records deleted from the subscriber database 104, and then later re-integrated labeled as new.

It must be noted that this level of granularity in the management of the subscriber database 104 is obtained via the real time nature of the data collected by the monitoring probe 90 and the subsequent real time nature of the information extracted from these data by the filtering system 110 and transmitted to the subscriber base system 100. The traditional information system of the Mobile Operator, by nature static, does not allow the introduction of the concept of label based on IP data session activity.

Additionally, the notion of upgraded subscriber record is introduced. An unchanged subscriber record is labeled as upgraded when a new mobile device is used for this subscriber record. To support this functionality, the filtering system 110 has the capability to identify the mobile device used to perform the IP data session, for the purpose of detecting a change of mobile device. In any type of mobile network (UMTS, CDMA, or WIMAX), the mobile devices (10, 12, 14) are identified by a unique identifier. It is the International Mobile Equipment Identity (IMEI) in the case of an UMTS network, the equivalent of the IMEI in the case of a CDMA network, and the Media Access Control (MAC) address of the terminal in the case of a WIMAX network. These unique identifiers of the mobile devices can be extracted by the filtering system from the IP data traffic collected by the monitoring probe 90 and transmitted to the filtering system 110.

For example, in the case of the capture of the IP data traffic on the Gn interface 64 of an UMTS network, the IMEI is extracted by the filtering system 110 from the GTP signaling traffic when present (the IMEI is an optional parameter of the GTP signaling protocol). Alternatively, if the Gi interface 66 is used, the IMEI is extracted from the RADIUS signaling protocol when present (the IMEI is also an optional parameter of the RADIUS signaling protocol). The IMEI is transmitted to the subscriber base system 100, along with the associated unique subscriber's identifier to which it is related.

When a new subscriber record is created in the subscriber database 104, a mobile device identifier is recorded. Subsequently, when a new mobile device identifier (different from the mobile device identifier recorded in the subscriber database 104 for the corresponding subscriber record) is detected for this subscriber record, this subscriber record is labeled as upgraded and the new mobile device identifier is stored in the corresponding subscriber record in the subscriber database 104. The timestamp present in the transmitted information is also stored in the subscriber database for the corresponding subscriber record (as an upgraded timestamp), to indicate the date of transition to the label upgraded. The transition to the label upgraded usually only happens for unchanged subscriber records. However, it may also affect some new subscriber records, which change their mobile device before becoming unchanged subscriber records.

An arbitrary upgraded delay is specified, during which a subscriber record labeled upgraded keeps its upgraded label. Upon expiration of this upgraded delay (the difference between the current time and the upgraded timestamp exceeds the upgraded delay), the subscriber record labeled as upgraded is allocated the label unchanged (even if it had the label new before). The subscriber database 104 may be regularly checked (every hour, or day, or week) to detect subscriber records labeled as upgraded which should be allocated the label unchanged.

Figure 4:
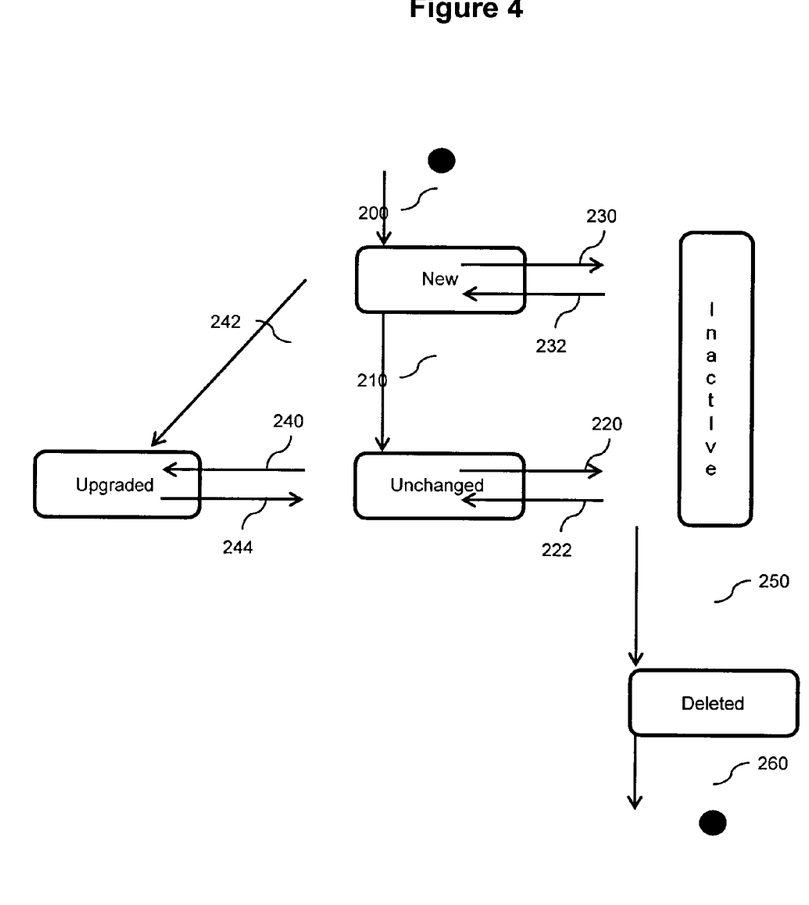
FIG. 4 illustrates transitions between different labels of a subscriber, according to a non-restrictive illustrative embodiment.

Reference is now made to FIG. 4, which illustrates transitions between the different labels of a subscriber record. Initially, the subscriber record is not present in the subscriber database 104. When the mobile device of a new subscriber is detected for the first time, a subscriber record is added to the subscriber database 104 and is allocated the label new 200. From the label new, three transitions are possible. First, if a new mobile device is detected for a subscriber record, the label of the corresponding subscriber record is allocated the label upgraded 242. Then, after a pre-determined amount of time with the label new, the subscriber record is allocated the label unchanged 210. Finally, if the subscriber record with the label new is inactive (on the mobile IP data network) for a pre-determined amount of time, the subscriber record is allocated the label inactive 230. If some activity (on the IP data network) is detected for this subscriber record, the subscriber record is re-allocated the label new 232. In the same manner, if the subscriber record with the label unchanged is inactive (on the mobile IP data network) for a pre-determined amount of time, the subscriber record is allocated the label inactive 220. If some activity (on the IP data network) is detected for this subscriber record, the subscriber record is re-allocated the label unchanged 222. After a pre-determined amount of time with the label inactive, the subscriber record is allocated the label deleted 250 and is removed 260 from the subscriber database 104. If a new mobile device is used for the subscriber record with the label unchanged, the subscriber record is allocated the label upgraded 240. After a pre-determined amount of time with the label upgraded, the subscriber record is allocated the label unchanged 244.

The subscriber database 104 can be exploited by the Mobile Operator for marketing purposes, using a business intelligence analytic system. The accuracy of the subscriber database 104 (it is updated in real time) and the segmentation of the subscriber records in different categories based on the allocated labels (new, unchanged, upgraded, and inactive) are two major benefits, compared to traditional subscriber databases relying on a static Mobile Operator information system. An example of application is audience measurements of the Mobile Operator data services and contents.

For instance, to measure the relative audience of a value added data service provided by the Mobile Operator (e.g. a mobile TV premium channel), it is advantageous to know the total number of subscriber records consuming the service at the time the measure is performed, and relate it to the total number of subscriber records constituting the Mobile Operator subscriber database 104. The more accurate the information in the subscriber records of the subscriber database 104 is, the better the audience evaluation will be. In particular, the inactive subscriber records (labeled as inactive) can be excluded from the subscriber database 104, to only consider active subscriber records (labeled as new, unchanged and upgraded) for the audience measurement. Also, the segmentation of subscriber records based on labels (new, unchanged, upgraded, and inactive) can be used to generate several customized audience measurements, to better reflect different status of the subscriber records.

Since advertising is becoming a critical way to generate revenues from the contents distributed over a Mobile Operator data network, having the capability to generate accurate, real time, segmented, audience measurements may be very useful. The subscriber database 104 defined in the present method and system is a very effective tool to achieve this goal.

The subscriber database 104 typically stores subscriber records only for the subscribers of the corresponding Mobile Operator, excluding roamers (i.e.

subscribers of another Mobile Operator using the mobile data network of the Mobile Operator considered). However, roamers can be taken into account in the present subscriber database 104 in the same manner as subscribers, by adding a flag to differentiate roamers records from subscriber records. The unique identifier of the roamer records is of the same type as for the subscriber records (for instance the IMSI in an UMTS network) and it is extracted in the same manner by the filtering system 110. Additional information must be extracted by the filtering system 110 from the data collected by the monitoring probe 90, to differentiate roamer records from subscriber records. For example, in the case of a UMTS network, the IMSI which is used as the unique identifier of the subscriber records contains a subsection identifying a parent Mobile Operator. Thus, the filtering system 110 extracts the IMSI of all ongoing data sessions, and analyzes these IMSI to differentiate subscribers from roamers. As mentioned earlier, the extraction by the filtering system 110 and the querying, storing and updating by the subscriber base system 100 is exactly the same for regular subscribers and roamers. A flag is however added in the subscriber database 104 to differentiate subscriber records from roamer records. The Mobile Operator may have the option to exclude roamers from its subscriber database 104 and only consider its subscribers (information transmitted by the filtering system 110 concerning roamers is ignored and not stored in the subscriber database 104).

An illustrative embodiment of the present method and system has been detailed in the context of a Mobile Operator. The method and system can also be applied in the context of an ISP operating an IP based fixed broadband network (for instance, a cable network, a Digital Subscriber Line (DSL) network, or an optical fiber network). The ISP offers Internet connectivity to its subscribers, by deploying a residential gateway in their household. The residential gateway is an interface between the subscriber's home network and the ISP access network. Examples of basic residential gateways include DSL modems or cable modems. Advanced residential gateways have additional capabilities.

Additionally, the ISP may not be interested in applying the subscriber database 104 concepts previously detailed to all its Internet subscriber records. Rather, the ISP may wish to focus on the subscriber database 104 for a premium service, like Internet Protocol Television (IPTV) or Video On Demand (VOD) services.

The following description describes an exemplary use of the present method and system for IPTV provided by an ISP. To provide the IPTV service, the ISP deploys a dedicated equipment in the subscriber's household: for example a Set Top Box (STB). The STB is positioned between the residential gateway and the TV set. The STB generates specialized IP traffic to interact with IPTV servers and modify TV channels being viewed. This specialized IP traffic is transported across the ISP access network to reach the IPTV servers.

For the purpose of illustration, the following description will be provided for a DSL infrastructure. A monitoring probe 90 similar to the one described in FIG. 1 is deployed in the ISP access network to collect the IP traffic related to IPTV. An appropriate point of capture could be somewhere between the Digital Subscriber Line Access Multiplexer (DSLAM) and the Broadband Remote Access System (BRAS). The exact location of the point of capture for the monitoring probe 90 is dependent on several access network deployment options that will not be detailed here. A filtering system 110 similar to the one described in FIG. 1 is used to extract information from the data collected by the monitoring probe 90.

To uniquely identify the IPTV subscriber records, the Media Access Control (MAC) address of the STBs is used. The MAC address is unique for a specific STB and is present in the IPTV traffic generated by the STB. Since the STB is owned by a specific subscriber record, its MAC address is a proper way to identify this subscriber record. The MAC address is extracted by the filtering system 110 and reported to the subscriber base system 100, as described in FIG. 1.

Over time, the STB in a subscriber record's household may be replaced by a new STB. Thus, the MAC address extracted by the filtering system 110 would change, while it relates to the same subscriber record. To avoid this issue, an external database (usually maintained by the ISP) shall be used, to map the current MAC address of the STB with a unique identifier representing the subscriber record to which corresponds the STB (for instance, it can be based on the subscriber's name). If the STB changes for a given subscriber record, it is possible to refer to the subscriber record's unique identifier through this mapping. The processing unit 102 in FIG. 3 performs the mapping between the MAC address and the associated unique identifier representing the subscriber record. The unique identifier is stored in the database 104 to represent the subscriber record.

Based on the MAC address of the STB, and its mapping to the unique identifier of the subscriber record, the subscriber database 104 can be updated almost in real time and the allocations of labels (new, unchanged, upgraded, and inactive) can be supported in a similar way as described for a Mobile Operator.

The notion of upgraded may not be relevant in the context of fixed broadband, since the number of equipments (for instance models of STBs) available from various manufacturers is limited and the frequency of upgrade of these equipments is low (compared to mobile devices in the context of mobile networks). However, this notion can be supported: a change of the MAC address of the STB for a specific subscriber record may be handled as an upgrade.

Coming back to the context of a Mobile Operator as described in FIG. 1, the notion of applying the subscriber database 104 concept to a specific mobile data service (as illustrated for IPTV in the context of an ISP) can also be implemented in the case of a Mobile Operator. The subscriber database 104 in the case of a Mobile Operator, as defined in the previous paragraphs, applies to the subscription of a mobile data plan in general, including any type of mobile data service. However, the filtering system 110 has the capability to identify, among the IP data traffic collected by the monitoring probe 90, specific IP packets related to a specific mobile data service. This capability is provided by the DPI engine of the filtering system 110. Thus, the subscriber records stored in the subscriber database 104 can be applied to a specific mobile service; a new field in the subscriber records being used to identify this specific mobile service. The labels new, unchanged and inactive are allocated to a subscriber record as described previously, but in the context of the specific mobile data service in question. However, the label upgraded is always allocated in relation to the use of a new mobile device, as previously described. A mobile TV service or a VoIP service constitutes examples of such specific mobile data services. The subscriber database 104 can track several specific mobile data services in parallel, using the field identifying each specific service subscribed to in the subscribers' records to monitor the subscriber base of these services in parallel.

Referring back to FIG. 3, an embodiment of the system architecture of the subscriber base monitoring system 100 is illustrated.

The subscriber base system 100 is composed of the following sub-entities: a processing unit 102 and a subscriber database 104. The inputs to the subscriber base system 100 are provided by one or several entities: for example the filtering system 110 introduced in FIG. 1. The subscriber database 104 generated by the subscriber base system 100 may be exploited by a dedicated entity: the analytic system 120. The aforementioned entities and sub-entities may be independent or co-located autonomous software programs or processes, executed on a computer and exchanging information therebetween.

The role of each entity has already been detailed in the previous paragraphs but will be briefly summarized, to provide a comprehensive understanding of an embodiment of the present system's architecture.

The filtering system 110 has already been extensively described. It relies on the DPI technology, well known in the art for performing IP based protocol analysis and classification. It extracts in real time from the IP data traffic (collected in real time by the monitoring probe 90) the parameters required by the subscriber base system 100 (the identifiers of the subscriber records performing a data session, the identifiers of the terminals used for this purpose when available, a timestamp, and the identification of a specific IP data service when applicable). For scalability reasons, several instances of the filtering system 110 may be deployed in the IP data network, and report to a single centralized subscriber base system 100.

The subscriber base system 100 has already been extensively described. It performs the analysis of the information provided by the filtering system 110, to update the subscriber database 104 in almost real time. Based on the time granularity required, the information can be transmitted by the filtering system(s) 110 to the subscriber base system 100 on an hourly or daily basis. The subscriber database 104 is a standard database, to store the subscriber records. A typical subscriber record in the subscriber database 104 comprises the unique identifier, associated to the subscriber record, the label (new, unchanged, upgraded, or inactive), timestamps (creation timestamp, activity timestamp, upgraded timestamp, and inactivity timestamp), an identifier of the specific data service subscribed to (for example a general mobile data plan or a specific mobile data service in the context of a Mobile Operator—an IPTV service in the context of an ISP), and the identifier of the device used when available (when extracted by the filtering system 110). The processing unit 102 analyzes the information provided by the filtering system 110 and queries the subscriber database 104 to detect necessary updates (e.g. addition of a new subscriber record, upgrade of the activity timestamp of an existing subscriber record). Additionally, the processing unit 102 regularly scans the subscriber database 104 to detect subscriber records for which modification of their label is required (e.g. transition from unchanged to inactive, transition from upgraded to inactive)

The analytic system 120 can take different forms, based on how an Operator wants to exploit the subscriber database 104. In most cases, it will consist in business intelligence tools, to generate marketing information. As already mentioned, one of the possible use of the subscriber database 104 is for the generation of precise audience measurements applied to the services and contents provided by the Operator.

Although the present method and system have been described in the foregoing specification by means of several non-restrictive illustrative embodiments, these illustrative embodiments can be modified at will within the scope, spirit and nature of the following claims.

What is claimed is:

1. A method for monitoring a base of subscribers in an IP data network, the method comprising:
    collecting by means of at least one monitoring probe real time data from IP data sessions;
    extracting by means of a computer implemented filtering system information from said real time data, the information comprising at least a unique identifier and a timestamp;
    transmitting said information from the computer implemented filtering system to a subscribers' base system, the subscribers' base system comprising a database of subscribers for storing a plurality of subscriber records and a computer implemented processing unit, each subscriber record comprising a unique identifier for the subscriber record;

querying by means of the computer implemented processing unit the database of subscribers with the unique identifier comprised in the extracted information to correlate the unique identifier comprised in the extracted information with a corresponding subscriber record;

updating by means of the computer implemented processing unit the subscriber record with the extracted information, or alternatively creating by means of the computer implemented processing unit a new subscriber record based on the extracted information when no corresponding subscriber record is found in the database of subscribers; and allocating by means of the computer implemented processing unit to each subscriber record a label and a timestamp of when the label was allocated, the label being allocated based on the extracted information;

wherein a label new is allocated to a subscriber record upon creation in the database of subscribers, and a label upgraded is allocated to a subscriber record for which the extracted information indicates that a new terminal is used for this subscriber record.

2. The method of claim 1 wherein a label unchanged is allocated to a subscriber record with the label new or upgraded, after a pre-defined amount of time.

3. The method of claim 1, further comprising:
querying the database of subscribers to identify a number of subscriber records subscribing to a particular service.

4. The method of claim 2 wherein a label inactive is allocated to a subscriber record, for which no information has been received by the subscribers' base system for a pre-defined amount of time.

5. The method of claim 4, further comprising:
querying the database of subscribers to identify a number of subscriber records subscribing to a particular service, the label of said subscriber records being a combination of at least one among new, unchanged, upgraded and inactive.

6. The method of claim 4, further comprising:
querying the database of subscribers to identify a number of subscriber records subscribing to a particular service;
querying the database of subscribers to identify a number of subscriber records subscribing to the particular service, the label of said subscriber records being a combination of at least one among new, unchanged, upgraded and inactive; and
generating a report comparing the number of subscriber records and the number of subscriber records with said combination of labels subscribing to the particular service.

7. A subscribers' base system comprising:
a database of subscribers for storing a plurality of subscriber records, each subscriber record comprising at least one service subscribed to, a unique identifier for the subscriber record, a label, and a timestamp of when the label was allocated;
a computer implemented processing unit for:
receiving information extracted in real time from an IP session, the information comprising at least one of the unique identifiers and a corresponding timestamp;
correlating received unique identifier with a corresponding subscriber record, and for updating the corresponding subscriber record with the extracted information, or alternatively for creating a new subscriber record based on the extracted information when no corresponding subscriber record is found in the database of subscribers; and
allocating to each subscriber record a label and a timestamp of when the label was allocated, the label being allocated based on the extracted information;
wherein a label new is allocated to a subscriber record upon creation in the database of subscribers, and a label upgraded is allocated to a subscriber record for which the extracted information indicates that a new terminal is used for this subscriber record.

8. The system of claim 7 wherein the service subscribed to is a subscription to a mobile data service.

9. The system of claim 7 wherein the service subscribed to is a subscription to an IPTV service.

10. The system of claim 7, wherein a label unchanged is allocated to a subscriber record with the label new or upgraded, after a pre-defined amount of time.

11. The system of claim 7, wherein a reporting module further queries the database of subscribers to identify a number of subscriber records subscribing to a particular service.

12. The system of claim 10, wherein a label inactive is allocated to a subscriber record, for which no information has been received for a pre-defined amount of time.

13. The system of claim 12, wherein a reporting module further queries the database of subscribers to identify a number of subscriber records subscribing to a particular service, the label of said subscriber records being a combination of at least one among new, unchanged, upgraded and inactive.

14. The system of claim 12, further comprising:
a reporting module for:
querying the database of subscribers to identify a number of subscriber records subscribing to a particular service;
querying the database of subscribers to identify a number of subscriber records subscribing to the particular service, the label of said subscriber records being a combination of at least one among new, unchanged, upgraded and inactive; and
wherein the reporting module further generates a report comparing the number of subscriber records and the number of subscriber records with said combination of labels subscribing to the particular service.

* * * * *